United States Patent
Uda et al.

(10) Patent No.: US 10,855,168 B2
(45) Date of Patent: Dec. 1, 2020

(54) POWER CONVERSION DEVICE HAVING BYPASS CIRCUIT PROTECTION

(71) Applicant: MITSUBISHI ELECTRIC CORPORATION, Tokyo (JP)

(72) Inventors: Ryosuke Uda, Tokyo (JP); Kenichi Kuroda, Tokyo (JP); Masashi Kitayama, Tokyo (JP); Yoshiyuki Kono, Tokyo (JP); Shigeo Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/079,861

(22) PCT Filed: Mar. 28, 2016

(86) PCT No.: PCT/JP2016/059922
§ 371 (c)(1),
(2) Date: Aug. 24, 2018

(87) PCT Pub. No.: WO2017/168519
PCT Pub. Date: Oct. 5, 2017

(65) Prior Publication Data
US 2019/0068076 A1 Feb. 28, 2019

(51) Int. Cl.
*H02M 1/36* (2007.01)
*H02M 1/32* (2007.01)
(Continued)

(52) U.S. Cl.
CPC ............ *H02M 1/32* (2013.01); *H02H 7/1257* (2013.01); *H02M 1/36* (2013.01); *H02H 3/087* (2013.01);
(Continued)

(58) Field of Classification Search
CPC . H02M 2007/4835; H02M 1/32; H02H 3/087
See application file for complete search history.

(56) References Cited

U.S. PATENT DOCUMENTS

2013/0308235 A1* 11/2013 Davies ................. H02H 7/1257
361/62
2015/0070802 A1* 3/2015 Dong ....................... H02H 3/16
361/49
(Continued)

FOREIGN PATENT DOCUMENTS

CN 103050955 B 3/2015
DE 102012204046 B3 * 8/2013 ............ H02M 7/483
(Continued)

OTHER PUBLICATIONS

Shenghui Cui, Sungmin Kim, Jae-Jung Jung, Seung-Ki Sul; Principle, Control and Comparison of Modular Multilevel Converters (MMCs) with DC Short Circuit Fault Ride-though Capability, IEEE, 2014 IEEE Applied Power Electronics Conference and Exposition APEC 2014, Mar. 20, 2014, pp. 610-616.*
(Continued)

*Primary Examiner* — Harry R Behm
(74) *Attorney, Agent, or Firm* — Buchanan Ingersoll & Rooney PC

(57) ABSTRACT

Each arm circuit of a power conversion device includes a plurality of cascaded cell blocks and a plurality of bypass circuits connected in parallel to the respective cell blocks. Each cell block includes: a first connection node on a high potential side and a second connection node on a low potential side for connection to another cell block; and a plurality of converter cells cascaded between the first and second connection nodes, each converter cell containing an energy storage. The plurality of converter cells include at least one first converter cell of a full-bridge (or hybrid)
(Continued)

configuration and at least one second converter cell of a half-bridge configuration.

13 Claims, 18 Drawing Sheets

(51) Int. Cl.
*H02H 7/125* (2006.01)
*H02J 3/36* (2006.01)
*H02M 7/483* (2007.01)
*H02H 3/087* (2006.01)

(52) U.S. Cl.
CPC ........ *H02J 3/36* (2013.01); *H02M 2007/4835* (2013.01)

(56) References Cited

U.S. PATENT DOCUMENTS

| | | | |
|---|---|---|---|
| 2015/0207310 A1* | 7/2015 | Bakran | H01H 9/542 |
| | | | 361/100 |
| 2015/0349520 A1 | 12/2015 | Davidson et al. | |
| 2015/0357905 A1* | 12/2015 | Nami | H02M 1/32 |
| | | | 363/53 |
| 2015/0357931 A1* | 12/2015 | Oates | H02M 7/493 |
| | | | 363/89 |
| 2016/0013716 A1* | 1/2016 | Hur | H02M 1/32 |
| | | | 363/50 |
| 2016/0036314 A1 | 2/2016 | Koyanagi et al. | |
| 2016/0094117 A1* | 3/2016 | Hu | H02M 1/32 |
| | | | 363/51 |
| 2016/0190924 A1* | 6/2016 | Koyanagi | H02M 7/483 |
| | | | 323/271 |
| 2016/0365787 A1* | 12/2016 | Geske | H02H 9/041 |
| 2017/0163170 A1* | 6/2017 | Tahata | H02J 5/00 |
| 2017/0163171 A1* | 6/2017 | Park | H02M 7/537 |
| 2017/0170658 A1* | 6/2017 | Tengner | H02J 3/28 |
| 2017/0288569 A1 | 10/2017 | Uda et al. | |
| 2018/0212533 A1* | 7/2018 | Nami | H02M 1/32 |

FOREIGN PATENT DOCUMENTS

| | | | | |
|---|---|---|---|---|
| EP | 2506415 A1 | 10/2012 | | |
| EP | 2549634 A1 | 1/2013 | | |
| EP | 2849306 A1 * | 3/2015 | | H02M 1/32 |
| JP | 2000134945 A | 5/2000 | | |
| JP | 2011193615 A | 9/2011 | | |
| JP | 5622978 B1 * | 11/2014 | | H02J 5/00 |
| JP | 5730458 B1 | 6/2015 | | |
| JP | 2015130743 A | 7/2015 | | |
| WO | 2011012174 A1 | 2/2011 | | |
| WO | 2011065253 A1 | 6/2011 | | |
| WO | WO-2014091801 A1 * | 6/2014 | | |
| WO | 2014148100 A1 | 9/2014 | | |
| WO | 2015/121983 A1 | 8/2015 | | |
| WO | WO-2017059924 A1 * | 4/2017 | | H02M 1/32 |

OTHER PUBLICATIONS

International Search Report (PCT/ISA/210) dated Jun. 7, 2016, by the Japanese Patent Office as the International Searching Authority for International Application No. PCT/JP2016/059922.
Extended European Search Report dated May 24, 2019, issued by the European Patent Office in corresponding European Application No. 16896739.6. (9 pages).

* cited by examiner

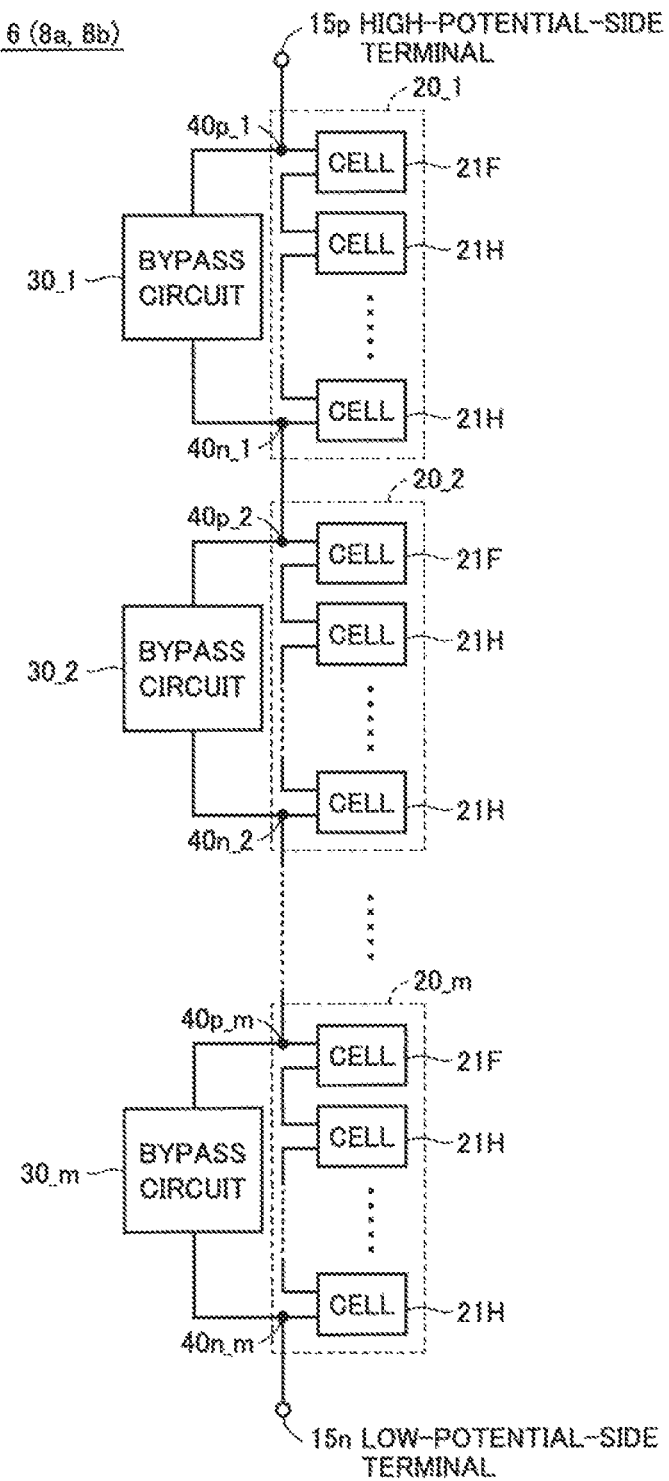

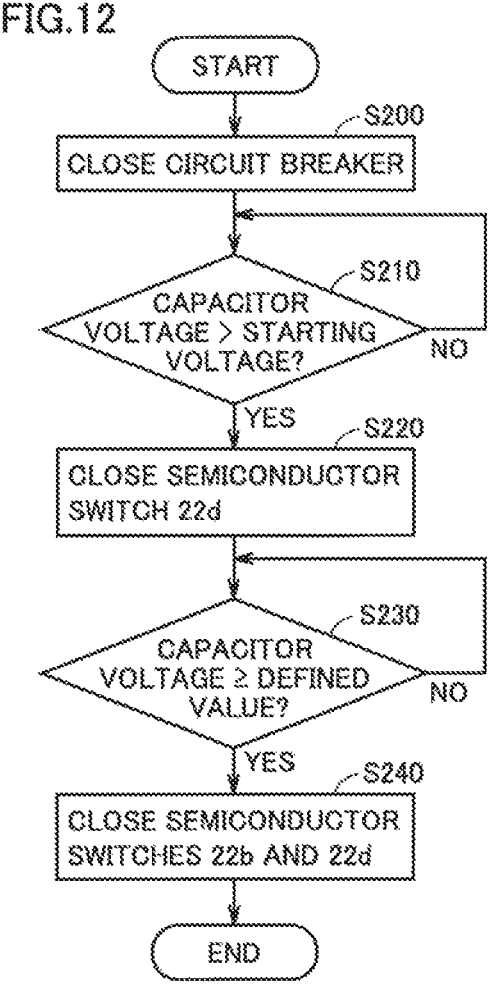

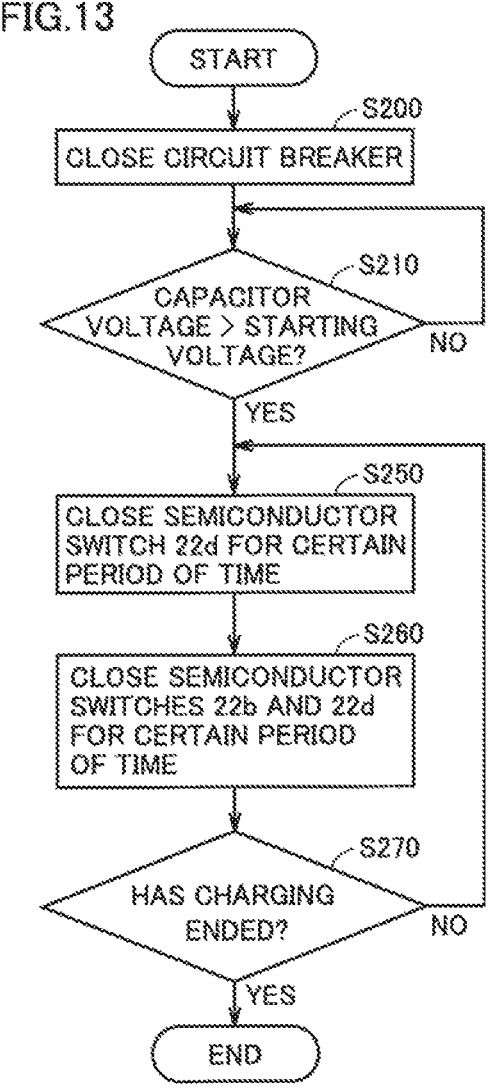

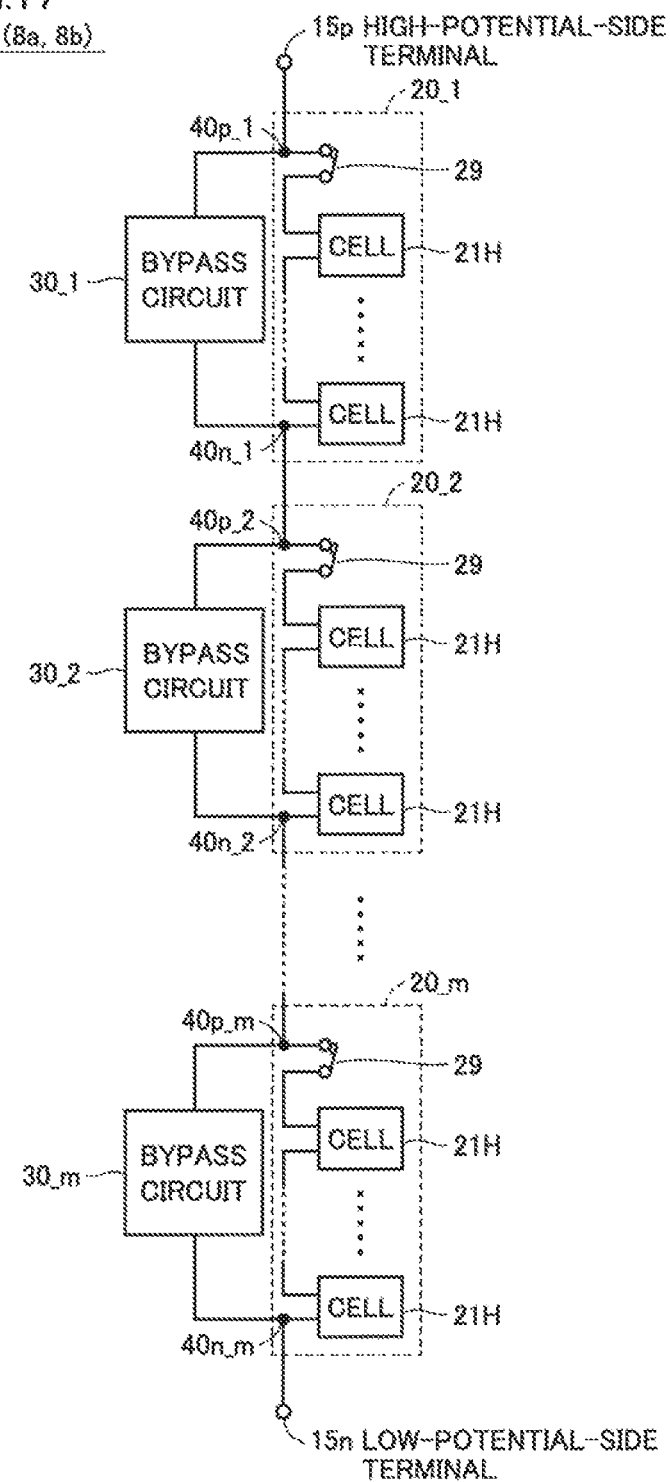

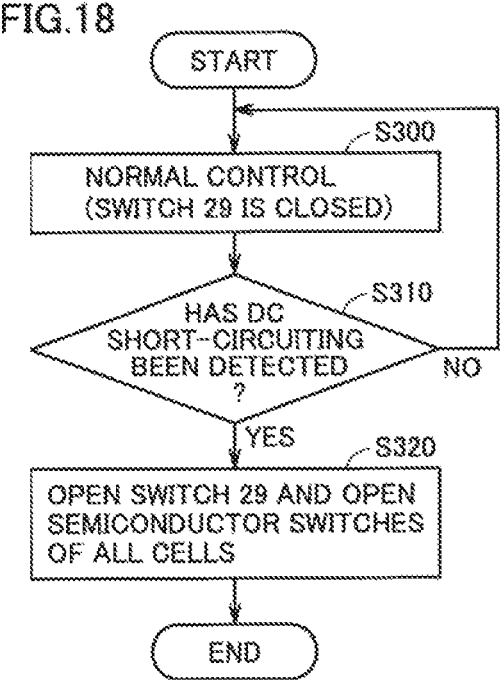

POWER CONVERSION DEVICE HAVING BYPASS CIRCUIT PROTECTION

TECHNICAL FIELD

This disclosure relates to a power conversion device which converts power between an alternating-current (AC) circuit and a direct-current (DC) circuit and is suitably used for what is called a modular multilevel converter.

BACKGROUND ART

A modular multilevel converter (MMC) is configured by multiplexing a plurality of converter cells in series for use in a high-voltage and high-current power system. More specifically, the modular multilevel converter includes for each AC phase, a first arm circuit (arm) connected to a positive-electrode-side DC terminal and a second arm circuit connected to a negative-electrode-side DC terminal. Each arm circuit includes a plurality of cascaded converter cells (chopper circuits). An AC voltage of a corresponding phase is applied to a portion of connection between the first arm circuit and the second arm circuit of each phase.

Each converter cell includes a capacitor as an energy storage and a plurality of switching elements for outputting a zero voltage or a capacitor voltage across output terminals. Each converter cell is of a full-bridge or half-bridge circuit configuration. For example, International Publication WO2011/012174 (PTD 1) discloses an example in which all converter cells are of a full-bridge configuration. US Patent Application Publication No. 2013/0308235 (PTD 2) discloses an example in which half of a plurality of converter cells constituting each arm circuit is of a full-bridge configuration and another half is of a half-bridge configuration.

CITATION LIST

Patent Document

PTD 1: International Publication WO2011/012174
PTD 2: US Patent Application Publication No. 2013/0308235

SUMMARY OF INVENTION

Technical Problem

When a short-circuiting failure occurs in a DC circuit, all switching elements constituting each converter cell are controlled to open. When a converter cell is of the full-bridge configuration, a short-circuiting current may flow into a capacitor as an energy storage.

When all converter cells in each arm circuit are of the full-bridge configuration as in PTD 1 or when half of the converter cells in each arm circuit is of the full-bridge configuration as in PTD 2, however, voltages of capacitors of the plurality of converter cells can be combined to prevent the short-circuiting current from flowing in and no problem arises. When the number of full-bridge converter cells included in each arm circuit is small, however, the short-circuiting current from the DC circuit continues to flow into the capacitors of the full-bridge converter cells. When a capacitor voltage consequently exceeds a withstand voltage, the capacitors will disadvantageously break.

This disclosure was made in consideration of the problems above, and one of objects thereof is to provide a power conversion device capable of preventing a capacitor included in a full-bridge converter cell from breaking when a DC circuit is short-circuited even though the number of full-bridge converter cells included in each arm circuit is decreased. Other tasks and novel features will be shown in the description herein and the attached drawings.

Solution to Problem

This disclosure is directed to a power conversion device which converts power between an AC circuit and a DC circuit and includes: a first arm circuit provided between an AC connection portion connected to the AC circuit and a positive-side DC terminal connected to the DC circuit; and a second arm circuit provided between the AC connection portion and a negative-side DC terminal connected to the DC circuit. Each of the first and second arm circuits includes one cell block or a plurality of cascaded cell blocks and one bypass circuit connected to the one cell block in parallel or a plurality of bypass circuits connected to the respective cell blocks in parallel. One cell block or each of the plurality of cell blocks includes: a first connection node on a high potential side and a second connection node on a low potential side for connection to another cell block; and a plurality of converter cells cascaded between the first and second connection nodes, each converter cell containing an energy storage. The plurality of converter cells include at least one first converter cell of a full-bridge (or hybrid) configuration and at least one second converter cell of a half-bridge configuration.

Advantageous Effects of Invention

According to this disclosure, each arm circuit includes one cell block or a plurality of cascaded cell blocks. The arm circuit is configured such that a bypass circuit is provided for each cell block and a full-bridge (or hybrid) converter cell is included for each cell block. A short-circuiting current is thus completely switched to flow through the bypass circuit when the DC circuit is short-circuited, and therefore the capacitor included in the full-bridge converter cell can be prevented from breaking.

BRIEF DESCRIPTION OF DRAWINGS

FIG. 2 is a circuit diagram showing an exemplary configuration of each arm circuit in FIG. 1 in the first embodiment.

FIG. 12 is a flowchart showing an operation by starting circuit 50 in FIG. 11.

FIG. 13 is a flowchart of a modification of FIG. 12.

FIG. 17 is a circuit diagram showing a configuration of the arm circuit in the power conversion device according to a fourth embodiment.

FIG. 18 is a flowchart showing one example of a control operation by the power conversion device including the arm circuit in FIG. 17.

DESCRIPTION OF EMBODIMENTS

Figure 1:
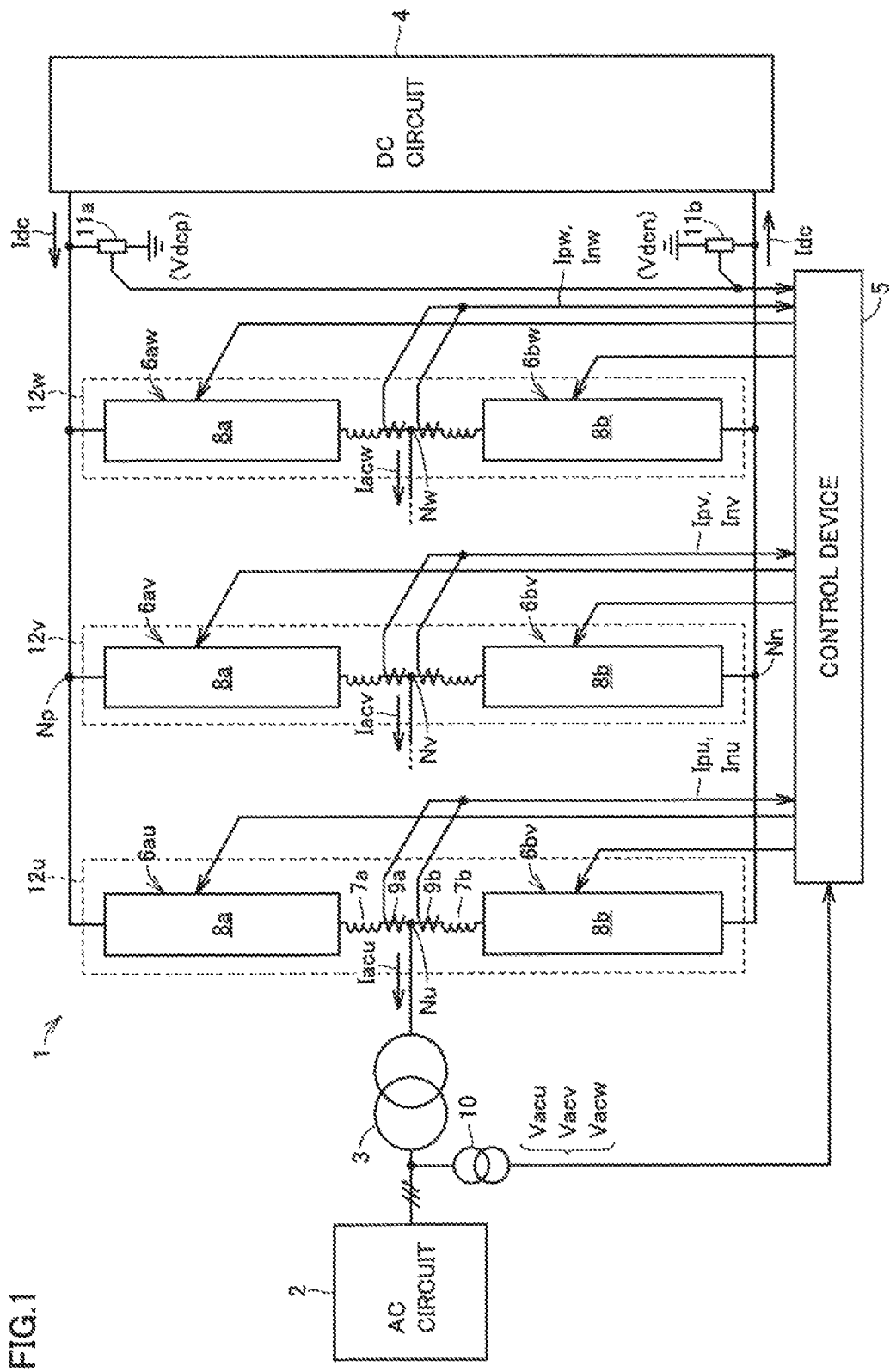
FIG. 1 is a schematic configuration diagram of a power conversion device according to a first embodiment.

Each embodiment will be described below in detail with reference to the drawings. The same or corresponding elements have the same reference characters allotted and description thereof will not be repeated.

First Embodiment

[Schematic Configuration of Power Conversion Device]

FIG. 1 is a schematic configuration diagram of a power conversion device according to a first embodiment. A power conversion device 1 is connected between an AC circuit 2 and a DC circuit 4 and converts power between these circuits. As shown in FIG. 1, power conversion device 1 includes leg circuits 12u, 12v, and 12w which are main circuits (which are denoted as a leg circuit 12 when they are collectively referred to or an unspecified one is referred to) and a control device 5 which controls these leg circuits 12. Control device 5 is implemented by a microcomputer including a microprocessor or a dedicated circuit configured with a field programmable gate array (FPGA).

Leg circuit 12 is provided for each of phases implementing an alternating current. FIG. 1 shows a three-phase AC circuit 2, and three leg circuits 12u, 12v, and 12w corresponding to a u phase, a v phase, and a w phase, respectively, are provided.

AC terminals Nu, Nv, and Nw provided in respective leg circuits 12u, 12v, and 12w are connected to AC circuit 2 with an interconnected transformer 3 being interposed. AC circuit 2 is, for example, an AC power system including an AC power supply. For facilitating illustration, FIG. 1 does not show connection of AC terminals Nv and Nw to interconnected transformer 3.

A positive-side DC terminal Np and a negative-side DC terminal Nn provided in common to leg circuits 12 are connected to DC circuit 4. DC circuit 4 is, for example, a DC power system including a DC power grid and another power conversion device which provides a DC output. In a forward conversion operation under a normal condition, a DC current Idc flows from DC circuit 4 toward negative-side DC terminal Nn of power conversion device 1 and flows from positive-side DC terminal Np of power conversion device 1 toward DC circuit 4. In a reverse conversion operation, a direction of flow is reverse to that.

Instead of interconnected transformer 3 in FIG. 1, power conversion device 1 may be connected to AC circuit 2 with an interconnected reactor being interposed. Instead of AC terminals Nu, Nv, and Nw, a primary winding may be provided in each of leg circuits 12u, 12v, and 12w, and leg circuits 12u, 12v, and 12w may be connected in an AC manner to interconnected transformer 3 or an interconnected reactor with a secondary winding magnetically coupled to the primary winding being interposed. In this case, the primary winding may be implemented by reactors 7a and 7b. Each of leg circuits 12u, 12v, and 12w is electrically (in a DC or AC manner) connected to AC circuit 2 with an AC connection portion provided in each of leg circuits 12u, 12v, and 12w being interposed, such as AC terminals Nu, Nv, and Nw or the above-described primary winding.

A plurality of converter cells constituting leg circuit 12u of the u phase are divided into a positive-side arm circuit (which is also referred to as an upper arm circuit or a primary arm circuit) 6au from positive-side DC terminal Np to AC terminal Nu and a negative-side arm circuit (which is also referred to as a lower arm circuit or a secondary arm circuit) 6bu from negative-side DC terminal Nn to AC terminal Nu. A point of connection between positive-side arm circuit 6au and negative-side arm circuit 6bu corresponds to AC terminal Nu. Similarly, leg circuit 12v of the v phase includes a positive-side arm circuit 6av and a negative-side arm circuit 6bv. Leg circuit 12w of the w phase includes a positive-side arm circuit 6aw and a negative-side arm circuit 6bw.

In the description below, denotation as a positive-side arm circuit 6a may be given when positive-side arm circuits of respective phases are collectively referred to or an unspecified one is referred to and denotation as a negative-side arm circuit 6b may be given when negative-side arm circuits of respective phases are collectively referred to or an unspecified one is referred to. Denotation as an arm circuit 6 may be given when positive-side and negative-side arm circuits of respective phases are collectively referred to or an unspecified one is referred to. A detailed configuration of each arm circuit 6 will be described with reference to FIG. 2.

Positive-side arm circuit 6a includes a cell group 8a including a plurality of cascaded converter cells (chopper cells) and reactor 7a. Cell group 8a and reactor 7a are connected in series to each other. For the sake of brevity, a converter cell (chopper cell) may be referred to as a cell below. A specific configuration of each converter cell will be described with reference to FIGS. 3A-3C. Similarly, negative-side arm circuit 6b includes a cell group 8b including a plurality of cascaded converter cells and reactor 7b. Cell group 8b and reactor 7b are connected in series to each other.

In u-phase leg circuit 12u, reactor 7a may be inserted in any position in positive-side arm circuit 6a and reactor 7b may be inserted in any position in negative-side arm circuit 6b. A plurality of reactors 7a and a plurality of reactors 7b may be provided. The reactors may be different in inductance value. Only reactor 7a of positive-side arm circuit 6a or only reactor 7b of negative-side arm circuit 6b may be provided. This is also applicable to v-phase leg circuit 12v and w-phase leg circuit 12w.

The power conversion device in FIG. 1 further includes an AC voltage detector 10, DC voltage detectors 11a and 11b, and arm current detectors 9a and 9b provided in each leg circuit 12 as detectors which detect electric quantities (a current and a voltage) used for control. Signals detected by these detectors are input to control device 5.

Specifically, AC voltage detector 10 detects a u-phase voltage value Vacu, a v-phase voltage value Vacv, and a w-phase voltage value Vacw of AC circuit 2. DC voltage detector 11a detects a voltage of positive-side DC terminal Np connected to DC circuit 4. DC voltage detector 11b detects a voltage of negative-side DC terminal Nn connected to DC circuit 4. Arm current detectors 9a and 9b provided in leg circuit 12u for the u phase detect an arm current Ipu which flows in positive-side arm circuit 6a and an arm current Inu which flows in negative-side arm circuit 6b, respectively. Similarly, arm current detectors 9a and 9b provided in leg circuit 12v for the v phase detect a positive-side arm current Ipv and a negative-side arm current Inv, respectively. Arm current detectors 9a and 9b provided in leg circuit 12w for the w phase detect a positive-side arm current Ipw and a negative-side arm current Inw, respectively. Arm currents Ipu, Inu, Ipv, Inv, Ipw, and Inw which flow from positive-side DC terminal Np toward negative-side DC terminal Nn are defined as positive currents.

[Configuration of Arm Circuit]

FIG. 2 is a circuit diagram showing an exemplary configuration of each arm circuit in FIG. 1 in the first embodiment. FIG. 2 does not show reactor 7a or 7b in each arm circuit (or may be regarded as showing cell group 8a or 8b in FIG. 1). In positive-side arm circuit 6a, a high-potential-side terminal 15p in FIG. 2 corresponds to positive-side DC terminal Np in FIG. 1 and a low-potential-side terminal 15n in FIG. 2 corresponds to AC terminal Nu, Nv, or Nw. In negative-side arm circuit 6b, high-potential-side terminal 15p in FIG. 2 corresponds to AC terminal Nu, Nv, or Nw in FIG. 1 and low-potential-side terminal 15n in FIG. 2 corresponds to negative-side DC terminal Nn.

Referring to FIG. 2, each arm circuit 6 includes m (m being an integer not smaller than 1) cascaded cell blocks 20_1 to 20_m from a first cell block 20_1 on a high potential side to an mth cell block 20_m on a low potential side. Denotation as a cell block 20 is given when cell blocks 20_1 to 20_m are collectively referred to or an unspecified one is referred to. A single cell block 20 may implement each arm circuit 6.

An ith cell block 20_i (i being any integer satisfying a condition of 1m) includes a first external connection node 40p_i on the high potential side and a second external connection node 40n_i on the low potential side for connection to another cell block 20 and a plurality of converter cells 21 (21F and 21H) cascaded between external connection nodes 40p_i and 40n_i. Denotation as an external connection node 40p or 40n is given when external connection nodes 40p_i or 40n_i are collectively referred to or an unspecified one is referred to.

In the first embodiment, each cell block 20 is characterized by including full-bridge converter cell 21F and half-bridge converter cell 21H as being mixed. Each cell block 20 includes at least one full-bridge converter cell 21F and at least one half-bridge converter cell 21H as converter cells 21. FIG. 2 shows an example in which each cell block 20 is constituted of one full-bridge converter cell 21F and a plurality of half-bridge converter cells 21H.

The number of converter cells 21 included in each cell block 20 may be different for each cell block 20. An order of arrangement of full-bridge converter cell 21F and half-bridge converter cell 21H included in each cell block 20 may be different for each cell block 20.

Each arm circuit 6 further includes m bypass circuits 30_1 to 30_m corresponding to m cell blocks 20_1 to 20_m, respectively (denotation as a bypass circuit 30 is given when bypass circuits are collectively referred to or an unspecified one is referred to). m bypass circuits 30 includes a first bypass circuit 30_1 on the high potential side to an mth bypass circuit 30_m on the low potential side. Each bypass circuit 30 is connected electrically in parallel to corresponding cell block 20 (that is, between external connection nodes 40p and 40n of corresponding cell block 20).

Each bypass circuit 30 is provided to switch a path of a DC short-circuiting current which flows through corresponding cell block 20 when a short-circuiting accident of DC circuit 4 occurs. Since the short-circuiting current flows in a direction from low-potential-side terminal 15n to high-potential-side terminal 15p in FIG. 2 (in a direction from external connection node 40n on the low potential side to external connection node 40p on the high potential side of each cell block 20), bypass circuit 30 is configured to allow more DC current to flow in this direction.

While DC circuit 4 is in a normal condition, a DC voltage is applied such that high-potential-side terminal 15p in FIG. 2 is higher in potential than low-potential-side terminal 15n (external connection node 40p in each cell block 20 is on the high potential side and external connection node 40n is on the low potential side). Therefore, each bypass circuit 30 is configured to block a current in a direction from high-potential-side terminal 15p to low-potential-side terminal 15n (in a direction from external connection node 40p to external connection node 40n in each cell block 20). An operation of each cell block 20 during a normal operation of DC circuit 4 is thus not interfered. A specific exemplary circuit configuration of bypass circuit 30 will be described with reference to FIGS. 4 and 5.

[Configuration of Converter Cell]

Figure 3A:
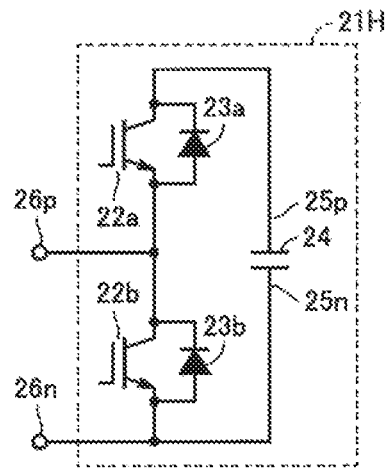
FIGS. 3A-3C are circuit diagrams each showing an exemplary configuration of a converter cell included in each cell block in FIG. 2.
Figure 3B:
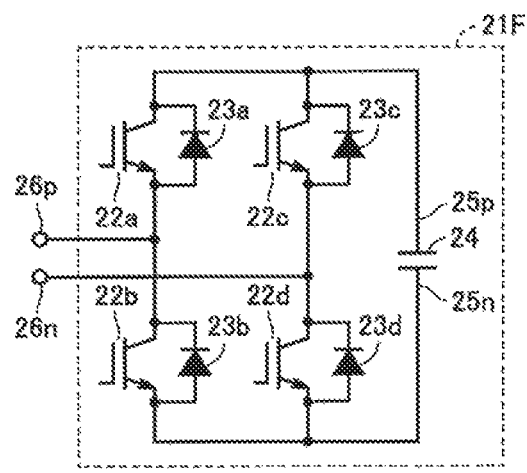
Figure 3C:
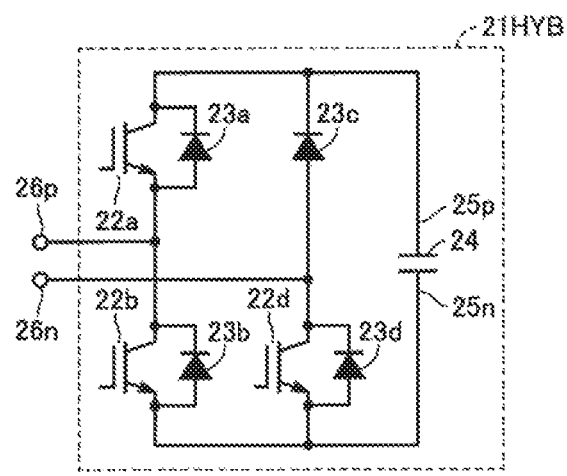

FIGS. 3A-3C are circuit diagrams each showing an exemplary configuration of the converter cell included in each cell block in FIG. 2. FIG. 3A shows a configuration of half-bridge converter cell 21H and FIG. 3B shows a configuration of full-bridge converter cell 21F. FIG. 3C shows one exemplary configuration of a hybrid converter cell 21HYB (which is also referred to as a hybrid bridge) which has functions of half-bridge converter cell 21H in FIG. 3A and full-bridge converter cell 21F in FIG. 3B as being combined. In the present embodiment, hybrid converter cell 21HYB can be employed instead of full-bridge converter cell 21F.

Referring to FIG. 3A, half-bridge converter cell 21H includes semiconductor switching elements 22a and 22b (which may hereinafter simply be referred to as a switching element) connected in series to each other, diodes 23a and 23b, and a DC capacitor 24 as an energy storage. Diodes 23a and 23b are connected in anti-parallel (in parallel and in a direction of a reverse bias) to switching elements 22a and 22b, respectively. DC capacitor 24 is connected in parallel to a series connection circuit of switching elements 22a and 22b and smoothes a DC voltage. A connection node between switching elements 22a and 22b is connected to a positive-side input and output terminal 26p and a connection node between switching element 22b and DC capacitor 24 is connected to a negative-side input and output terminal 26n.

In half-bridge converter cell 21H, switching elements 22a and 22b are controlled such that one is turned on (closed) and the other is turned off (open). When switching element 22a is turned on and switching element 22b is turned off, a voltage across opposing ends of DC capacitor 24 is applied across input and output terminals 26p and 26n (a positive-side voltage being applied to input and output terminal 26p and a negative-side voltage being applied to input and output terminal 26n). In contrast, when switching element 22a is turned off and switching element 22b is turned on, 0 V is applied across input and output terminals 26p and 26n.

Converter cell 21H shown in FIG. 3A can output a zero voltage or a positive voltage (dependent on a voltage of DC capacitor 24) by alternately turning on switching elements 22a and 22b. Diodes 23a and 23b are provided for securing a current path when voltages in reverse directions are applied to switching elements 22a and 22b.

Referring to FIG. 3B, full-bridge converter cell 21F is different from half-bridge converter cell 21H in FIG. 3A in further including switching elements 22c and 22d connected in series and diodes 23c and 23d connected in anti-parallel to switching elements 22c and 22d. Switching elements 22c and 22d as a whole are connected in parallel to the series connection circuit of switching elements 22a and 22b and connected in parallel to DC capacitor 24. Input and output terminal 26p is connected to the connection node between switching elements 22a and 22b and input and output terminal 26n is connected to a connection node between switching elements 22c and 22d.

Full-bridge converter cell 21F is controlled such that switching element 22d is normally turned on, switching element 22c is normally turned off, and switching elements 22a and 22b are alternately turned on during a normal operation (that is, a zero voltage or a positive voltage is output across input and output terminals 26p and 26n).

Full-bridge converter cell 21F can also output a zero voltage or a negative voltage by normally turning off switching element 22a, normally turning on switching element 22b, and alternately turning on switching elements 22c and 22d.

Referring to FIG. 3C, hybrid converter cell 21HYB is configured with any one of switching elements 22a, 22b, 22c, and 22d having been removed from full-bridge converter cell 21F shown in FIG. 3B. FIG. 3C shows a configuration with switching element 22c having been removed.

Hybrid converter cell 21HYB shown in FIG. 3C is controlled to normally turn on switching element 22d and alternately turn on switching elements 22a and 22b during a normal operation (that is, a zero voltage or a positive voltage is output across input and output terminals 26p and 26n).

In a modification of the above in which switching element 22a is removed from FIG. 3B, a zero voltage or a negative voltage can be output under such control to normally turn on switching element 22b and alternately turn on switching elements 22c and 22d.

In a configuration in which switching element 22b is removed from FIG. 3B, a zero voltage or a positive voltage can be output under such control to normally turn on switching element 22a and alternately turn on switching elements 22c and 22d.

In a configuration in which switching element 22d is removed from FIG. 3B, a zero voltage or a negative voltage can be output under such control to normally turn on switching element 22c and alternately turn on switching elements 22a and 22b. A self-turn-off switching element capable of control of both of an on operation and an off operation is employed for each of switching elements 22a, 22b, 22c, and 22d in FIGS. 3A-3C. For example, an insulated gate bipolar transistor (IGBT) or a gate commutated turn-off thyristor (GCT) is employed as switching elements 22a, 22b, 22c, and 22d.

[Configuration Example of Bypass Circuit]

Figure 4A:
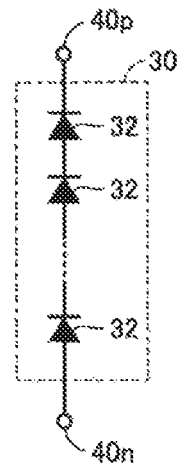
FIGS. 4A and 4B are circuit diagrams each showing an exemplary configuration of a bypass circuit in FIG. 2.
Figure 4B:
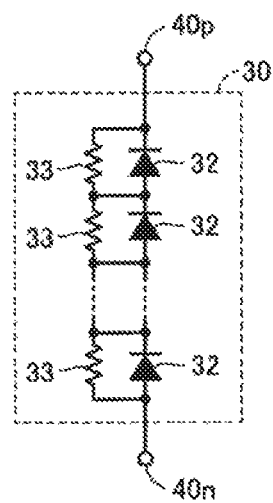

FIGS. 4A and 4B are circuit diagrams each showing an exemplary configuration of the bypass circuit in FIG. 2. Referring to FIG. 4A, bypass circuit 30 includes a plurality of diode elements 32 connected in series. A cathode of each diode element 32 is provided on the high potential side and an anode of each diode element 32 is provided on the low potential side. The direction from external connection node 40n on the low potential side to external connection node 40p on the high potential side (that is, the direction from negative-side DC terminal Nn to positive-side DC terminal Np) is defined as a forward direction of each diode element 32.

When a short-circuiting accident of DC circuit 4 occurs, a DC short-circuiting current flows in the direction from external connection node 40n on the low potential side to external connection node 40p on the high potential side, and therefore the DC short-circuiting current can flow through the plurality of diode elements 32 in each bypass circuit 30. Each cell block 20 is thus protected. On the other hand, application of a DC voltage during a normal operation of DC circuit 4 in such a manner that external connection node 40p is on the high potential side and external connection node 40n is on the low potential side is reverse in direction to diode elements 32 and hence no current can flow through bypass circuit 30.

When diode elements 32 constituting bypass circuit 30 are varied in characteristics, voltages allocated to diode elements 32 are varied and hence diode element 32 to which a voltage higher than a voltage applied to other diode elements is applied may break due to overvoltage. In order to avoid this problem, an avalanche diode is desirably employed for each diode element 32. When a voltage equal to or higher than a defined level is applied across the anode and the cathode of the avalanche diode, a leakage current increases before it breaks. Increase in voltage in the avalanche diode itself can thus be suppressed and a voltage can be allocated to other diode elements 32.

FIG. 4B shows a modification of FIG. 4A. Bypass circuit 30 in FIG. 4B is different from bypass circuit 30 in FIG. 4A in including resistive elements 33 connected in parallel to respective diode elements 32. Resistive elements 33 have resistance values substantially equal to one another. A resistance value of resistive element 33 is set to a relatively high value such that substantially no current flows through each resistive element 33 in the direction from external connection node 40p on the high potential side to external connection node 40n on the low potential side during a normal operation of the power system. By setting resistance values of resistive elements 33 substantially equal to one another, voltages allocated to diode elements 32 can substantially be equal so that diode element 32 can be prevented from breaking.

[Current Path when Short-Circuiting Failure Occurs in DC Circuit]

A current path at the time when a short-circuiting failure occurs in the DC circuit will be described below in further detail with reference to FIGS. 5 to 8.

Figure 5:
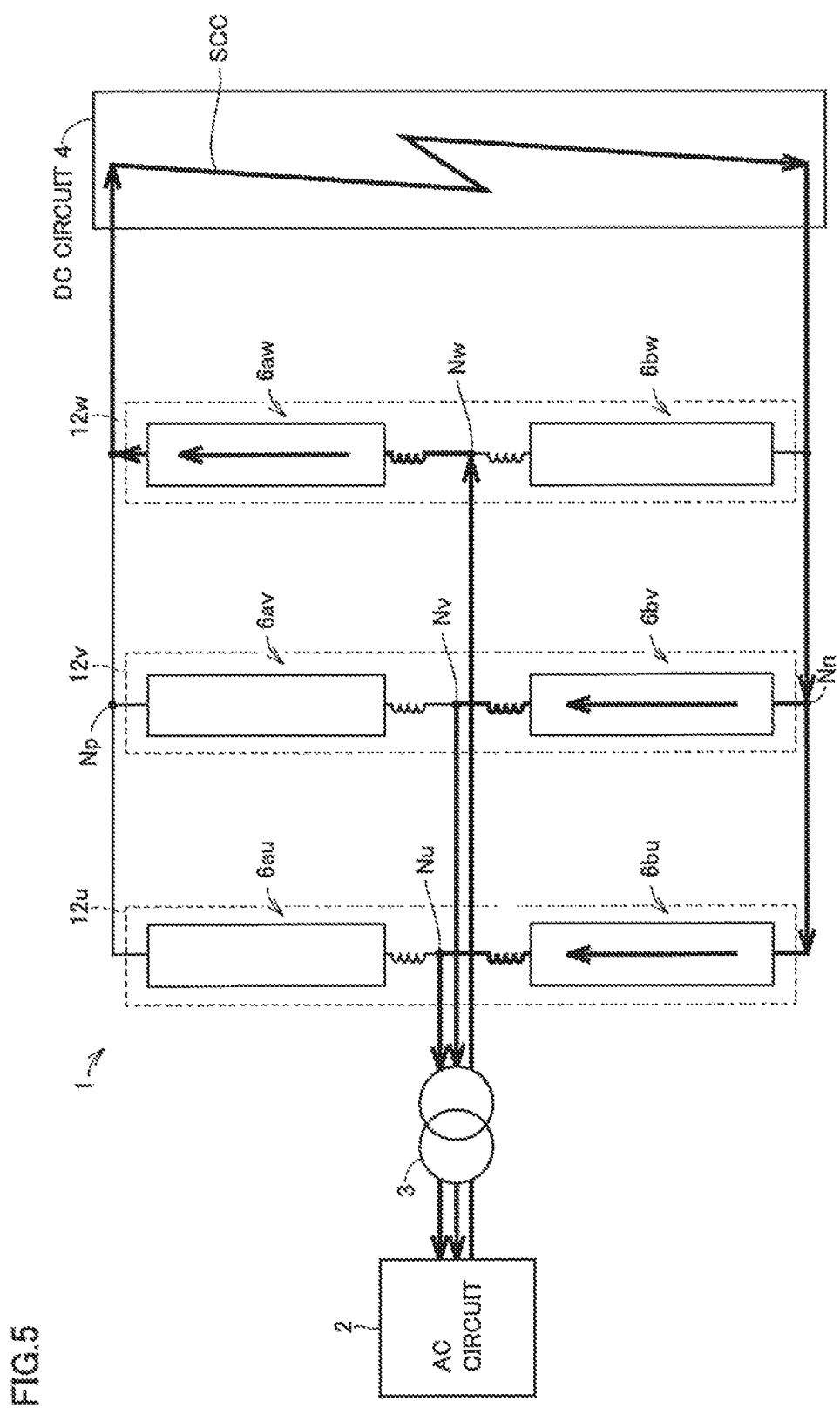
FIG. 5 is a diagram showing a path of a short-circuiting current in a short-circuiting failure of a DC circuit.

FIG. 5 is a diagram showing a path of a short-circuiting current in a short-circuiting failure of the DC circuit. Referring to FIG. 5, a short-circuiting current SCC which flows from the high potential side to the low potential side in DC circuit 4 flows in a direction from negative-side DC terminal Nn to positive-side DC terminal Np in power conversion device 1. In which of the plurality of arm circuits 6au, 6av, 6aw, 6bu, 6bv, and 6bw the short-circuiting current flows is different depending on a phase of an AC current which flows between AC circuit 2 and power conversion device 1. In FIG. 5, the current flows from negative-side DC terminal Nn through u-phase negative-side arm circuit 6bu and v-phase negative-side arm circuit 6bv to AC circuit 2 and flows in a direction from AC circuit 2 through w-phase positive-side arm circuit haw to positive-side DC terminal Np.

A detailed path of a DC short-circuiting current which flows through each arm circuit 6 will now be described. A current path in the arm circuit in a comparative example where no bypass circuit 30 is provided is initially shown below and a current path in an example where bypass circuit 30 is provided will be described next.

Figure 6:
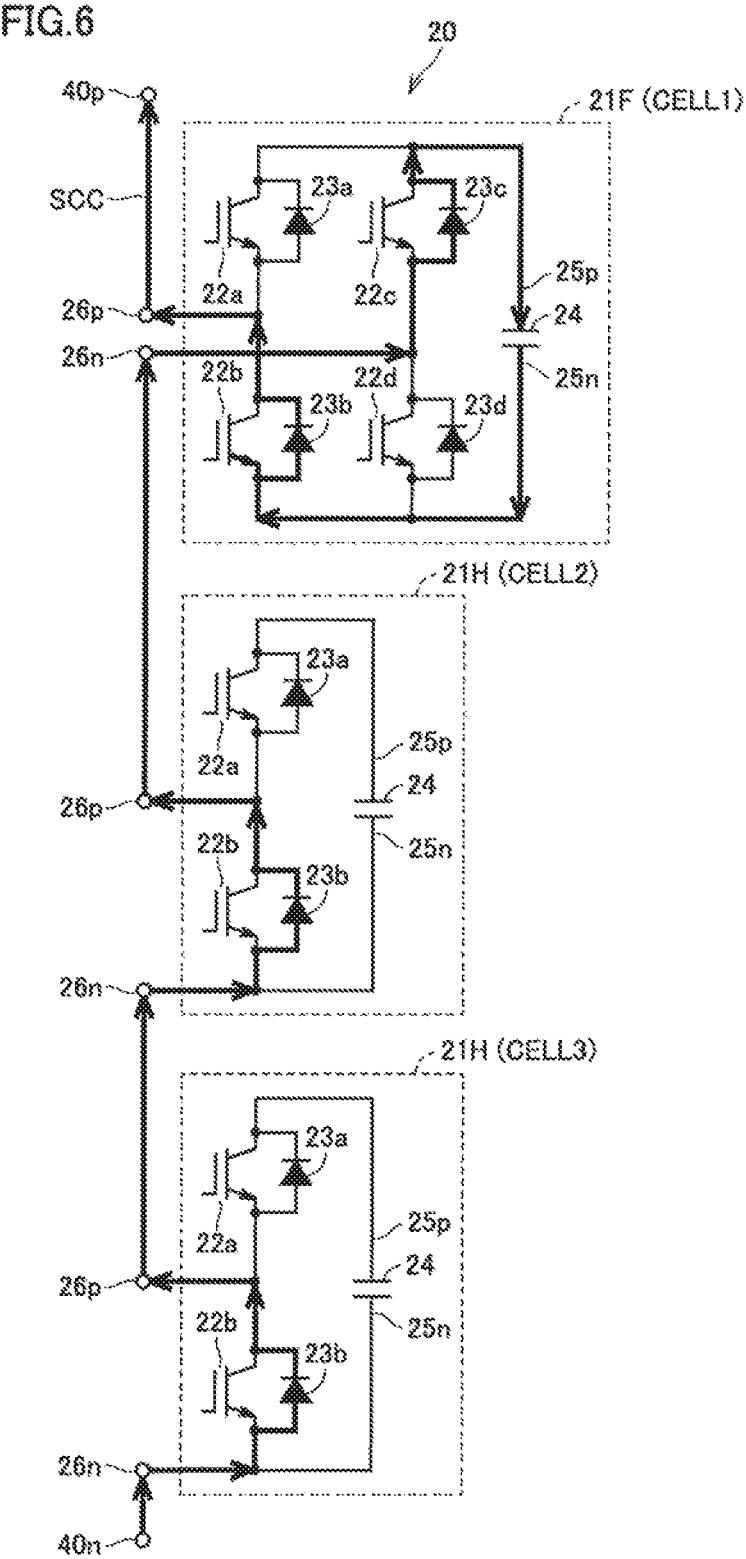
FIG. 6 is a circuit diagram for illustrating a path of a DC short-circuiting current which flows through the arm circuit in a comparative example of the present embodiment where no bypass circuit is provided.

FIG. 6 is a circuit diagram for illustrating a path of a DC short-circuiting current which flows through the arm circuit in the comparative example of the present embodiment where no bypass circuit is provided. In the circuit diagram in FIG. 6, a path of a DC short-circuiting current which flows through one cell block 20 constituting the arm circuit is shown. Cell block 20 in FIG. 6 is constituted of one full-bridge converter cell 21F (CELL1) and two half-bridge converter cells 21H (CELL2 and CELL3). The path of the short-circuiting current is shown with a bold arrow in FIG. 6.

Referring to FIG. 6, when a short-circuiting accident occurs in DC circuit 4, in order to cut off a discharging current from DC capacitor 24 as an energy storage element of cell block 20, semiconductor switches 22a, 22b, 22c, and 22d in converter cells CELL1, CELL2, and CELL3 constituting cell block 20 are all opened (turned off). The DC short-circuiting current flows through freewheeling diodes 23b in half-bridge converter cells 21H (CELL2 and CELL3).

In full-bridge converter cell 21F (CELL1), the short-circuiting current flows from input and output terminal 26n on the low potential side through a freewheeling diode 23c into a positive-side terminal 25p of DC capacitor 24. The short-circuiting current flows in a direction from a negative-side terminal 25n of DC capacitor 24 through freewheeling diode 23b to input and output terminal 26p on the high potential side. Consequently, DC capacitor 24 constituting full-bridge converter cell 21F is kept charged and hence it may break due to overvoltage.

Figure 7:
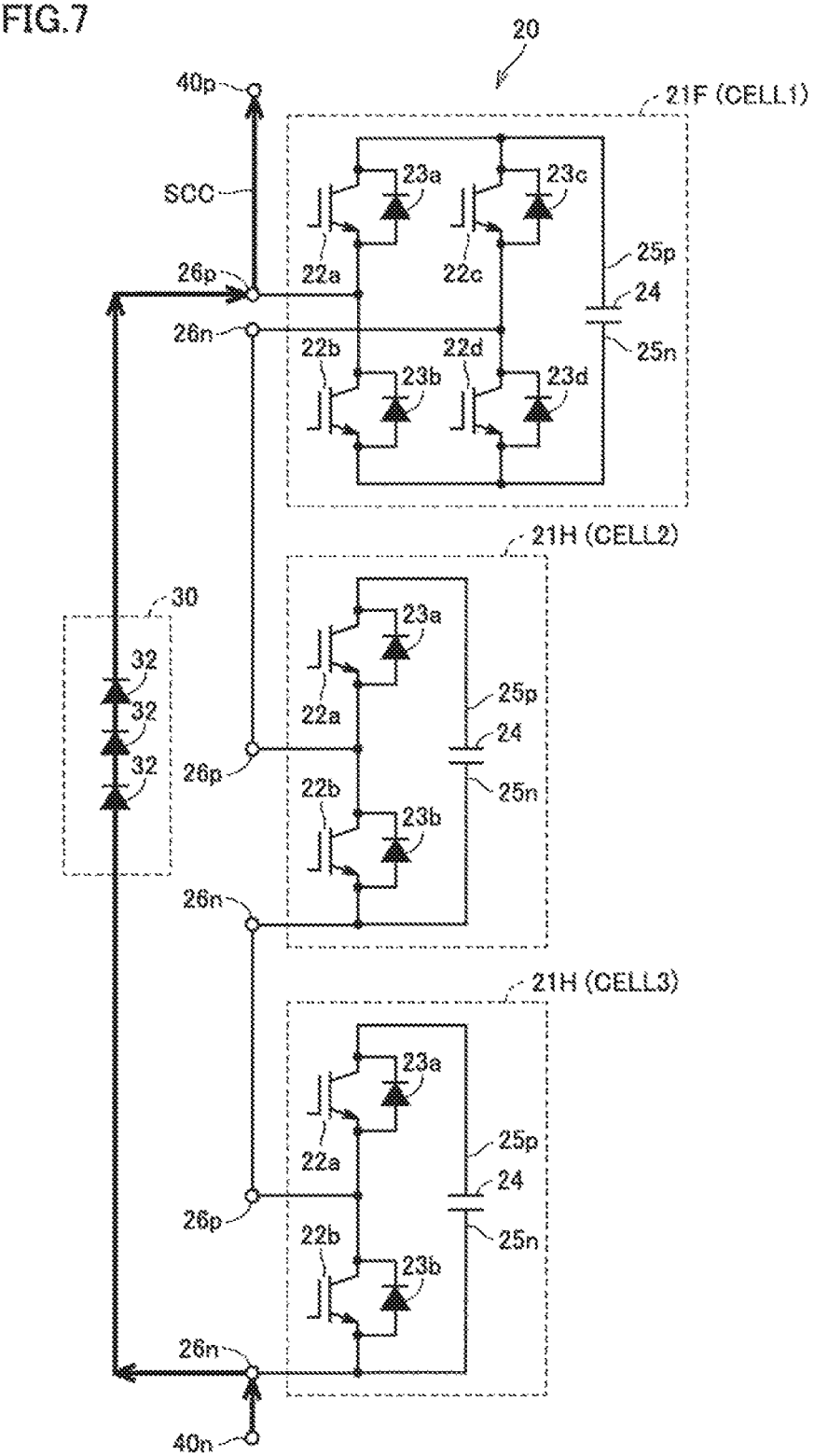
FIG. 7 is a circuit diagram for illustrating a path of a DC short-circuiting current which flows through the arm circuit in the present embodiment.

FIG. 7 is a circuit diagram for illustrating a path of a DC short-circuiting current which flows through the arm circuit in the present embodiment. The circuit diagram in FIG. 7 corresponds to the circuit diagram in FIG. 6, and it is different from the circuit diagram in FIG. 6 in that bypass circuit 30 is provided in parallel to cell block 20 between external connection node 40p on the high potential side and external connection node 40n on the low potential side. FIG. 7 shows a path of the short-circuiting current with a bold arrow.

Referring to FIG. 7, when a short-circuiting accident occurs in DC circuit 4, semiconductor switches 22a, 22b, 22c, and 22d in converter cells CELL1, CELL2, and CELL3 constituting cell block 20 are opened (turned off). In this case, DC capacitor 24 in converter cell 21F (CELL1) is interposed in series in the current path in cell block 20 so that the short-circuiting current is cut off and completely switched to flow through bypass circuit 30. Therefore, no short-circuiting current flows to cell block 20. Consequently, DC capacitor 24 constituting full-bridge converter cell 21F (CELL1) is protected.

When each cell block 20 consists of half-bridge converter cells 21H, the short-circuiting current flows also to freewheeling diode 23b in each converter cell 21H and hence the short-circuiting current flows through both of bypass circuit 30 and cell block 20. In contrast, by including full-bridge converter cell 21F among the plurality of converter cells 21 constituting cell block 20 as above, the short-circuiting current flows only through bypass circuit 30 and complete switching in path from cell block 20 to bypass circuit 30 can be realized.

[Control Operation by Power Conversion Device]

Figure 8:
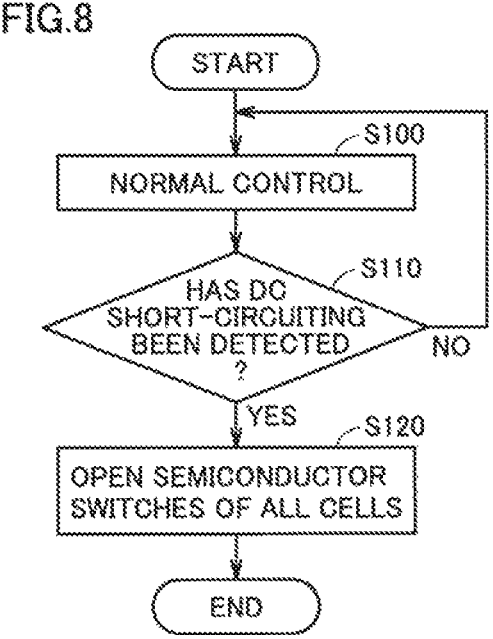
FIG. 8 is a flowchart schematically showing a control operation by a control device in FIG. 1.

FIG. 8 is a flowchart schematically showing a control operation by the control device in FIG. 1. A control operation by control device 5 in FIG. 1 will be described below with reference to FIGS. 2 and 8 while the description so far is summarized.

When an accident is not occurring in the power system, control device 5 carries out normal control (step S100). In this case, control device 5 controls an output voltage from each converter cell 21 constituting each arm circuit 6. When bypass circuit 30 is constituted of diode elements 32 connected in series as shown in FIGS. 4A and 4B, at least one of the plurality of converter cells 21 constituting each cell block 20 should be controlled to output a positive voltage so as not to generate a current through bypass circuit 30 (in the forward direction of diode elements 32). Such control can be realized, for example, based on pulse width control for each cell block 20. When there is only a single cell block in the entire arm, a similar effect is obtained by avoiding an overmodulated state by using normal pulse width control with modulation factor limiter.

Then, when control device 5 detects a short-circuiting accident on a side of DC circuit 4 (for example, when an absolute value of arm current Ipu, Ipv, Ipw, Inu, Inv, or Inw exceeds a threshold value or when a total value of arm currents of the phases exceeds a threshold value (YES in step S110), control device 5 controls semiconductor switching elements 22a, 22b, 22c, and 22d in all converter cells 21 constituting each arm circuit 6 to open (to turn off) (step S120).

For example, when a short-circuiting accident occurs in DC circuit 4, an excessively high arm current is detected (YES in step S110). Therefore, all semiconductor switching elements 22a, 22b, 22c, and 22d are controlled to open (turn off) (step S120). Consequently, as described above, complete switching in path of the short-circuiting current from each cell block 20 to corresponding bypass circuit 30 is realized.

[Effect]

As set forth above, according to power conversion device 1 in the first embodiment, each arm circuit 6 is configured to include one cell block 20 or a plurality of cascaded cell blocks 20. Arm circuit 6 is configured such that bypass circuit 30 is provided for each cell block 20 and full-bridge or hybrid converter cell 21F or 21HYB is included for each cell block 20.

According to the configuration above, when a short-circuiting failure occurs in DC circuit 4, DC capacitor 24 in full-bridge or hybrid converter cell 21F or 21HYB is interposed in a current path in each cell block 20. DC capacitor 24, however, is not charged with the short-circuiting current but DC capacitor 24 rather cuts off the short-circuiting current. Therefore, the short-circuiting current can be completely switched to flow through bypass circuit 30. Therefore, DC capacitor 24 constituting full-bridge or hybrid converter cell 21F or 21HYB can be protected.

Second Embodiment

A variation of a configuration of bypass circuit 30 will be described with reference to FIGS. 9 and 10 in a second embodiment.

[Configuration and Effect of Bypass Circuit]

Figure 9:
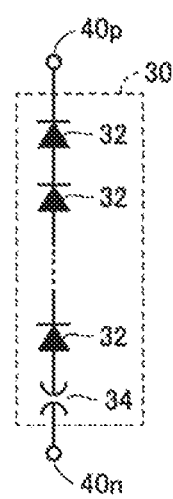
FIG. 9 is a circuit diagram showing a configuration of each bypass circuit in the power conversion device in a second embodiment.

FIG. 9 is a circuit diagram showing a configuration of each bypass circuit in the power conversion device in the second embodiment. Bypass circuit 30 in FIG. 9 is different from bypass circuit 30 in FIG. 4A in further including a discharge gap 34 connected in series to diode elements 32. In FIG. 9, discharge gap 34 and diode elements 32 may be arranged in any order.

Discharge gap 34 is made up of two hemispherical metal plates such that projecting surfaces of the metal plates face each other. No current flows in discharge gap 34 until a voltage across opposing metal plates attains to a threshold voltage. When the voltage exceeds the threshold voltage, however, dielectric breakdown in air occurs between the opposing metal plates so that discharge gap 34 is short-circuited and a current flows through bypass diodes 32.

An element which has such non-linear current and voltage characteristics that a voltage across terminals lowers owing to a flow of a current when a voltage exceeding a threshold voltage is applied across the terminals could be employed instead of discharge gap 34. For example, a thyristor can be employed instead of the discharge gap. The thyristor, however, separately requires an ignition circuit and hence a dual-terminal element such as a discharge gap (an element which includes a first main electrode and a second main electrode but does not include a control electrode) is more desirable.

By interposing discharge gap 34 in bypass circuit 30 as in FIG. 9, when the power system is normally operating (where discharge gap 34 is not in a discharging state), no current flows in the direction from external connection node 40n on the low potential side to external connection node 40p on the high potential side through bypass circuit 30. Therefore, unlike the first embodiment, at least one of the plurality of converter cells 21 constituting cell block 20 does not have to be controlled to output a positive voltage (that is, all converter cells 21 constituting cell block 20 may be controlled such that output voltages therefrom are zero voltages).

When a short-circuiting failure occurs in DC circuit 4, DC capacitor 24 in full-bridge converter cell 21F provided in each cell block 20 is once charged with a DC short-circuiting current. When a voltage of DC capacitor 24 exceeds the threshold voltage, however, a short-circuiting current flows through discharge gap 34 and is switched in path from cell block 20 to bypass circuit 30. Consequently, DC capacitor 24 provided in full-bridge converter cell 21F is protected.

[Modification of Bypass Circuit]

Figure 10A:
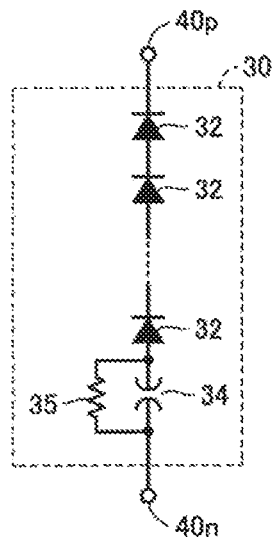
FIGS. 10A and 10B are circuit diagrams each showing a modification of the bypass circuit in FIG. 9.
Figure 10B:
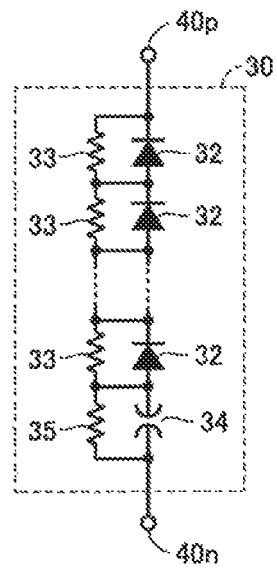

FIGS. 10A and 10B are circuit diagrams each showing a modification of the bypass circuit in FIG. 9. Bypass circuit 30 in FIG. 10A is different from bypass circuit 30 in FIG. 9 in including an avalanche diode as each diode element 32 and including a resistive element 35 connected in parallel to discharge gap 34.

By allowing a leakage current from the avalanche diode to flow in the direction from external connection node 40p on the high potential side to external connection node 40n on the low potential side during a normal operation of the power system, voltages allocated to diode elements 32 are made uniform. In order to allow the leakage current to flow, resistive element 35 is provided in parallel to discharge gap 34. A resistance value of resistive element 35 is selected such that a voltage generated as a result of flow of the leakage current through resistive element 35 does not reach a threshold voltage (a discharging start voltage) of discharge gap 34.

Bypass circuit 30 in FIG. 10B represents a modification different from that in FIG. 10A. Specifically, bypass circuit 30 in FIG. 10B is different from bypass circuit 30 in FIG. 9 in including resistive element 33 provided in parallel to each diode element 32 and resistive element 35 provided in parallel to discharge gap 34. Resistive elements 33 are substantially equal in resistance value to one another. Since voltages allocated to diode elements 32 are thus substantially equal, diode elements 32 can be prevented from breaking.

A resistance value of resistive element 33 is set to a relatively high value such that substantially no current flows through each resistive element 33 in the direction from external connection node 40p on the high potential side to external connection node 40n on the low potential side during a normal operation of the power system. Resistance values of resistive elements 33 and 35 are set such that a voltage generated in resistive element 35 by a current which flows through resistive elements 33 and resistive element 35 does not reach a threshold voltage (discharging start voltage) of discharge gap 34.

Third Embodiment

[Problem in Starting Power Conversion Device]

A third embodiment aims to solve the problem in starting in power conversion device 1 in the second embodiment.

Referring to FIG. 1, when power conversion device 1 is started, a circuit breaker (not shown) provided between AC circuit 2 and power conversion device 1 is closed. DC capacitor 24 provided in each converter cell 21 is thus charged with AC power from AC circuit 2. Since each converter cell 21 normally operates with a charging voltage of DC capacitor 24 provided in each converter cell 21 being used as a power supply (without necessarily being limited to this power supply configuration), each converter cell does not operate until charging of DC capacitor 24 proceeds to some extent. During a period until a voltage of DC capacitor 24 increases and reaches a defined value, all semiconductor switching elements 22a, 22b, 22c, and 22d in each converter cell 21 are opened (turned off).

At the time of start in the example above, DC capacitor 24 in full-bridge converter cell 21F (and hybrid converter cell 21HYB) is charged twice as fast as DC capacitor 24 in half-bridge converter cell 21H for the following reason. Referring to FIG. 3A, in half-bridge converter cell 21H, DC capacitor 24 is charged when a current flows into converter cell 21H in the direction from input and output terminal 26p on the high potential side to input and output terminal 26n on the low potential side, whereas DC capacitor 24 is not charged when a current flows in a reverse direction. In contrast, in full-bridge converter cell 21F (and hybrid converter cell 21HYB), DC capacitor 24 is charged when the current may flow in either direction.

Therefore, when a charging voltage of DC capacitor 24 in full-bridge converter cell 21F (or hybrid converter cell 21HYB) exceeds the threshold voltage of discharge gap 34 before control device 5 starts control at the time of start of power conversion device 1, discharging occurs in discharge gap 34. Discharge gap 34 which could withstand repeated discharging might be applicable, however, if it is not the case, the circuit configuration should be devised such that discharge gap 34 does not discharge at the time of start. For example, measures below can be taken. The measures below are also effective when a thyristor is provided instead of discharge gap 34.

[Exemplary Measures Against Problem in Starting]

(1) A power supply circuit for driving a semiconductor switching element in full-bridge converter cell 21F should be operable at a voltage as low as possible (which is referred to as a "low-voltage circuit").

Full-bridge converter cell 21F is started at a voltage as low as possible, and after converter cell 21F is started, any one of semiconductor switching elements 22a, 22b, 22c, and 22d in full-bridge converter cell 21F in FIG. 3B is closed (turned on). DC capacitor 24 can thus be charged only for half a cycle of an alternating current. When any one of semiconductor switching elements 22a and 22d is closed (turned on) in full-bridge converter cell 21F, capacitor 24 is charged when a current flows in a direction from positive-side input and output terminal 26p to negative-side input and output terminal 26n (a direction downward in the figure) and hence an operation is totally equivalent to that of half-bridge converter cell 21H. When any one of semiconductor switching elements 22b and 22c is closed (turned on), capacitor 24 is charged when a current flows in a direction from negative-side input and output terminal 26n to positive-side input and output terminal 26p (a direction upward in the figure).

Similarly, also in hybrid converter cell 21HYB in FIG. 3C, a rate of charging can be lowered by closing (turning on) any one of three semiconductor switching elements 22.

Until control is switched to turn on one of semiconductor switching elements 22a and 22d in full-bridge converter cell 21F, increase in voltage of capacitor 24 is greater in full-bridge converter cell 21F than in half-bridge converter cell 21H. Therefore, when capacitor 24 in full-bridge converter cell 21F and capacitor 24 in half-bridge converter cell 24h are charged at an identical rate after switching of control, full-bridge cell 21F attains to a defined voltage earlier. In order to avoid this problem, for example, capacitor 24 in full-bridge cell 21F may desirably be higher in capacity than capacitor 24 in half-bridge cell 21H. Other methods for avoiding this problem will be described in a next section (2).

Figure 11:
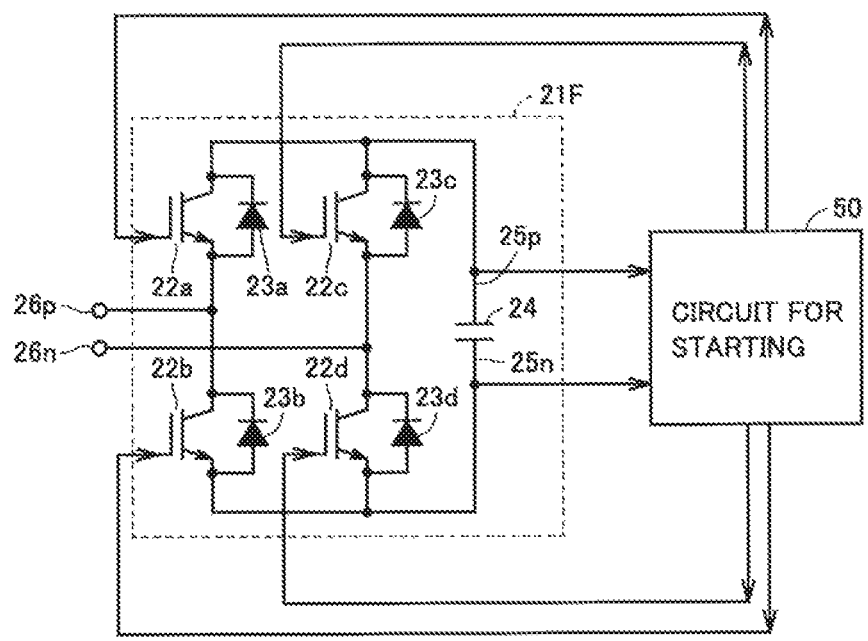
FIG. 11 is a circuit diagram showing connection of a starting circuit 50 provided in a full-bridge converter cell in the power conversion device in a third embodiment.

(2) A starting circuit dedicated for full-bridge converter cell 21F is provided. FIG. 11 is a circuit diagram showing connection of a starting circuit 50 provided in a full-bridge converter cell in the power conversion device in the third embodiment. FIG. 12 is a flowchart showing an operation by starting circuit 50 in FIG. 11.

Referring to FIGS. 11 and 12, starting circuit 50 is driven by a charging voltage for DC capacitor 24 and configured to be operable at a voltage as low as possible. Starting circuit 50 starts operating when a charging voltage for DC capacitor 24 exceeds a starting voltage (YES in step S210) after a circuit breaker (not shown) is closed between AC circuit 2 and power conversion device 1 in FIG. 1 (step S200). The starting voltage is set to a voltage as low as possible. Until starting circuit 50 operates, semiconductor switching elements 22a to 22d are all open (turned off).

Starting circuit 50 closes (turns on) any one of semiconductor switching elements 22a and 22d in converter cell 21F (step S220) after it starts operating. Other semiconductor switching elements are open (turned off). Thus, as in half-bridge converter cell 21H, DC capacitor 24 is charged only for half a cycle of an alternating current.

Then, starting circuit 50 detects a voltage of capacitor 24 and determines whether or not a voltage of capacitor 24 has attained to a defined value (step S230). When the voltage of capacitor 24 has attained to the defined value (YES in step S230), both of semiconductor switching elements 22b and 22d or both of semiconductor switching elements 22a and 22c are closed (turned on) (step S240). In other words, two switching elements provided on two respective arms directly connected to any of the positive-side and negative-side terminals of capacitor 24, of four arms implementing the full bridge, are closed (turned on). Since a current thus flows as bypassing capacitor 24, charging of capacitor 24 can be stopped.

As in (1) above, any one of semiconductor switching elements 22a, 22b, 22c, and 22d may be closed (turned on) by starting circuit 50 in step S220. In hybrid converter cell 21HYB, any one of three semiconductor switching elements 22 is closed (turned on) also.

In step S240, also in hybrid converter cell 21HYB (see FIG. 3C), two semiconductor switching elements provided on two respective arms directly connected to the positive-side terminal or the negative-side terminal of capacitor 24, of four arms implementing the hybrid bridge, are closed (turned on). For example, in converter cell 21HYB shown in FIG. 3C, semiconductor switching elements 22b and 22d are closed (turned on).

FIG. 13 is a flowchart of a modification of FIG. 12. Referring to FIGS. 11 and 13, a process until starting circuit 50 starts operating (steps S200 and S210) is the same as in FIG. 12 and description will not be repeated.

Starting circuit 50 alternately repeats after it starts operating, a first control state (step S250) in which any one of semiconductor switching elements 22a and 22d constituting converter cell 21F is controlled to turn on (close) for a certain period of time and a second control state (step S260) in which both of semiconductor switching elements 22a and 22c or both of semiconductor switching elements 22b and 22d are controlled to turn on (close) for a certain period of time (any of step S250 and step S260 may be performed first). Capacitor 24 in half-bridge cell 21H can thus be higher in rate of charging than capacitor 24 in full-bridge cell 21F.

Steps S250 and S260 are repeated until the voltage of capacitor 24 attains to the defined value and charging ends (until determination as YES is made in step S270). A ratio between the certain period of time in step S250 and the certain period of time in step S260 is adjusted such that capacitor 24 in half-bridge cell 21H and capacitor 24 in full-bridge cell 21F are equal to each other in voltage when charging ends.

Any one of semiconductor switching elements 22a, 22b, 22c, and 22d may be closed (turned on) by starting circuit 50 in step S250. In hybrid converter cell 21HYB, any one of three semiconductor switching elements 22 is closed (turned on).

In step S260, semiconductor switching elements 22b and 22d or semiconductor switching elements 22a and 22c may be closed (turned on) by starting circuit 50. In other words, two semiconductor switching elements provided on two respective arms directly connected to the positive-side terminal or the negative-side terminal of capacitor 24, of four arms implementing the full bridge (or the hybrid bridge), are closed (turned on). In hybrid converter cell 21HYB as well, two semiconductor switching elements provided on two respective arms directly connected to the positive-side terminal or the negative-side terminal of capacitor 24 are closed (turned on). For example, in converter cell 21HYB shown in FIG. 3C, semiconductor switching elements 22b and 22d are closed (turned on).

Figure 14A:
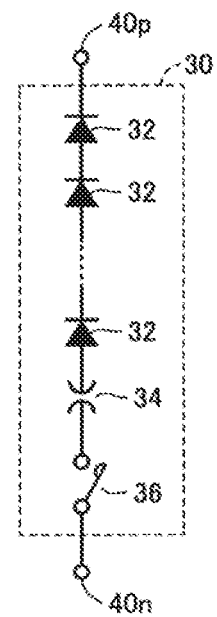
FIGS. 14A and 14B are circuit diagrams each showing another modification of the bypass circuit in FIG. 9.
Figure 14B:
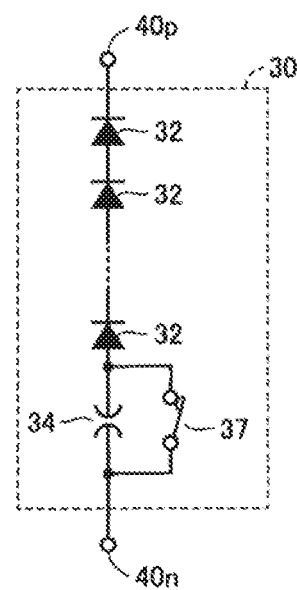

(3) A switch is provided in series or in parallel to a discharge gap. FIGS. 14A and 14B are circuit diagrams each showing another modification of the bypass circuit in FIG. 9. FIG. 14A shows an example in which a normally open (open at the time of start) switch 36 is provided in series to discharge gap 34. Discharging can thus be prevented from occurring in discharge gap 34 when power conversion device 1 is started. Switch 36 is closed (turned on) after power conversion device 1 is started. Switch 36 may be a mechanical switch or a semiconductor switch such as a thyristor.

FIG. 14B shows an example in which a normally closed (closed at the time of start) switch 37 is provided in parallel to discharge gap 34. Discharging can thus be prevented from occurring in discharge gap 34 when power conversion device 1 is started. Switch 37 is opened (turned off) after power conversion device 1 is started. Switch 37 may be a mechanical switch or a semiconductor switch which can be used under a relatively high current.

(4) A normally closed switch is provided in parallel to any one of semiconductor switching elements implementing the full bridge.

Figure 15:
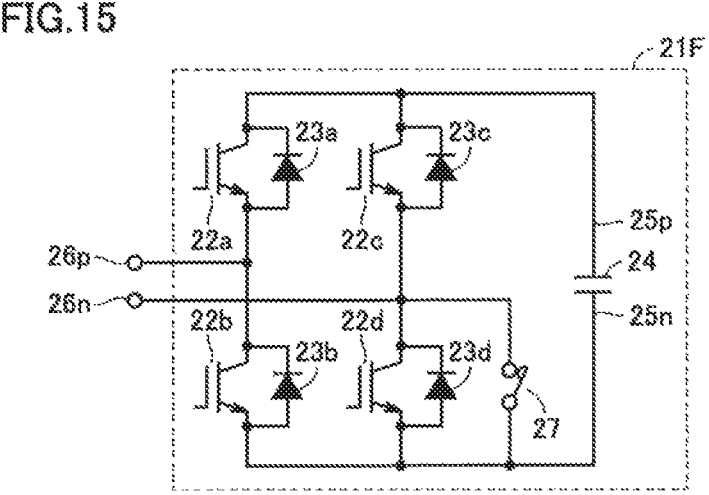
FIG. 15 is a circuit diagram showing a modification of the full-bridge converter cell in FIG. 3B.

FIG. 15 is a circuit diagram showing a modification of the full-bridge converter cell in FIG. 3B. Converter cell 21F in FIG. 15 is different from converter cell 21F in FIG. 3B in including a normally closed (closed at the time of start) switch 27 provided in parallel to semiconductor switching element 22d and FIG. 15 is otherwise the same as FIG. 3B.

According to the configuration in FIG. 15, as in half-bridge converter cell 21H, DC capacitor 24 is charged only for half a cycle of an alternating current at the time of start of power conversion device 1. Switch 27 is opened (turned off) after power conversion device 1 is started. Switch 27 may be a mechanical switch or a semiconductor switch.

Switch 27 may be connected in parallel to any one of semiconductor switching elements 22a, 22b, 22c, and 22d. In hybrid converter cell 21HYB, switch 27 is connected in parallel to any one of three semiconductor switching elements 22a, 22b, and 22d and flywheel diode 23c.

(5) A resistive element is connected in parallel to the discharge gap. A resistance value of this resistive element is set to a relatively small value such that discharge gap 34 does not discharge owing to a voltage generated in the resistive element at the time of start of power conversion device 1. A resistance value of resistive element 35 can be set such that bypass circuit 30 described with reference to FIGS. 10A and 10B also function similarly.

Figure 16:
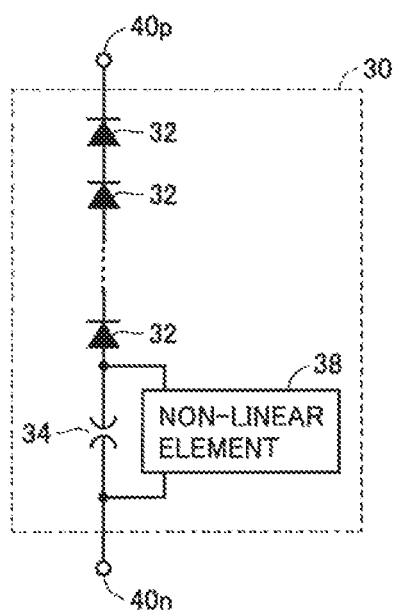
FIG. 16 is a circuit diagram showing yet another modification of the bypass circuit in FIG. 9.

(6) A non-linear element is provided in parallel to the discharge gap. FIG. 16 is a circuit diagram showing yet another modification of the bypass circuit in FIG. 9.

Bypass circuit 30 in FIG. 16 is different from bypass circuit 30 in FIG. 9 in further including a non-linear element 38 connected in parallel to discharge gap 34. Non-linear element 38 is implemented, for example, by a Zener diode and it is an element which has such non-linear current and voltage characteristics that a current abruptly increases when a voltage is equal to or greater than a threshold value. A threshold voltage of the non-linear element is set to be lower than a gap discharging voltage.

According to the configuration in FIG. 16, when a current is low, for example, in initial charging of capacitor 24 in each converter cell 21, a current flows through non-linear element 38 in bypass circuit 30. When a high current flows due to a short-circuiting accident in DC circuit 4, a voltage across main electrodes of non-linear element 38 increases and exceeds a gap discharging start voltage and consequently a current flows through discharge gap 34. Undue discharging of discharge gap 34 at the time of initial charging can thus be avoided.

In FIG. 16 as well, as described with reference to FIG. 10A, an avalanche diode may be employed as each diode element 32 and resistive element 35 for allowing a leakage current to flow may be provided in parallel to both of discharge gap 34 and non-linear element 38. Alternatively, as described with reference to FIG. 10B, resistive element 33 may be provided in parallel to each diode element 32 and resistive element 35 may be provided in parallel to both of discharge gap 34 and non-linear element 38. According to such a circuit configuration, voltages can uniformly be allocated to diode elements 32.

Fourth Embodiment

Means for realizing complete switching in path of a short-circuiting current from cell block 20 to bypass circuit 30 at the time of occurrence of an accident in DC circuit 4 without using full-bridge converter cell 21F will be described in a fourth embodiment.

FIG. 17 shows a circuit diagram showing a configuration of the arm circuit in the power conversion device according to the fourth embodiment. Arm circuit 6 in FIG. 17 is different from arm circuit 6 in FIG. 2 in including a switch 29 instead of full-bridge converter cell 21F. Switch 29 may be a mechanical switch or a semiconductor switch. As described in the third embodiment, when control device 5 in FIG. 1 is driven by a charging voltage for DC capacitor 24 in each converter cell 21, switch 29 is desirably normally closed.

Since FIG. 17 is otherwise the same as FIG. 2, the same or corresponding elements have the same reference characters allotted and description will not be repeated.

FIG. 18 is a flowchart showing one example of a control operation by the power conversion device including the arm circuit in FIG. 17. Referring to FIGS. 17 and 18, when an accident is not occurring in the power system, control device 5 carries out normal control as in FIG. 8 (step S300). In this case, control device 5 controls switch 29 to close (turn on).

Then, when control device 5 detects a short-circuiting accident on the side of DC circuit 4 (for example, an absolute value of arm current Ipu, Ipv, Ipw, Inu, Inv, or Inw exceeds a threshold value or a total value of arm currents of the phases exceeds the threshold value) (YES in step S310), it opens (turns off) semiconductor switching elements 22a, 22b, 22c, and 22d in all converter cells 21 constituting each arm circuit 6 and controls switch 29 to open (turn off) (step S320).

For example, when a short-circuiting accident occurs in DC circuit 4, an excessively high arm current is detected (YES in step S310). In this case, switch 29 is opened (turned off) so that complete switching in path of a short-circuiting current from cell block 20 to bypass circuit 30 can be realized.

It should be understood that the embodiments disclosed herein are illustrative and non-restrictive in every respect. The scope of this invention is defined by the terms of the claims rather than the description above and is intended to include any modifications within the scope and meaning equivalent to the terms of the claims.

REFERENCE SIGNS LIST 1 power conversion device; 2 AC circuit; 3 interconnected transformer; 4 DC circuit; 5 control device; 6, 6au, 6av, 6aw, 6bu, 6bv, 6bw arm circuit; 7a, 7b reactor; 8a, 8b cell group; 9a, 9b arm current detector; 10 AC voltage detector; 11a, 11b DC voltage detector; 12, 12u, 12v, 12w leg circuit; 20 cell block; 21, 21F, 21H, 21HYB converter cell; 22, 22a, 22b, 22c, 22d semiconductor switching element; 23a, 23b, 23c, 23d freewheeling diode; 24 DC capacitor; 26n, 26p input and output terminal; 27, 29, 36, 37 switch; 30 bypass circuit; 32 diode element; 33, 35 resistive element; 34 discharge gap; 40n, 40p external connection node; 50 starting circuit; Nn negative-side DC terminal; Np positive-side DC terminal; and Nu, Nv, Nw AC terminal

The invention claimed is:

1. A power conversion device which converts power between an AC circuit and a DC circuit, the power conversion device comprising:
   a first arm circuit provided between an AC connection portion connected to the AC circuit and a positive-side DC terminal connected to the DC circuit; and
   a second arm circuit provided between the AC connection portion and a negative-side DC terminal connected to the DC circuit,
   each of the first and second arm circuits including:
      a plurality of cascaded cell blocks; and
      a plurality of bypass circuits connected to the respective cell blocks in parallel, each of the plurality of cell blocks including:
         a first connection node on a high potential side and a second connection node on a low potential side for connection to another cell block; and
         a plurality of converter cells cascaded between the first and second connection nodes, each converter cell containing an energy storage and semiconductor switching elements,
   all of the semiconductor switching elements contained in each converter cell being controlled to turn off when a short-circuiting failure occurs in the DC circuit,
   the plurality of converter cells included in each of the plurality of cell blocks including:
      at least one first converter cell of a full-bridge or hybrid configuration; and
      at least one second converter cell of a half-bridge configuration,
   each of the plurality of bypass circuits including:
      a plurality of diode elements connected in series such that a direction from the negative-side DC terminal to the positive-side DC terminal is defined as a forward direction;
      a dual-terminal element connected in series to the plurality of diode elements, wherein
   a discharge gap is adopted as the dual-terminal element, and
   when a short-circuiting failure occurs in the DC circuit, a DC short-circuiting current flows through the discharge gap and the plurality of diode elements in each of the plurality of bypass circuits.

2. The power conversion device according to claim 1, wherein
   the dual-terminal element has such a non-linear current and voltage characteristic that when a voltage not lower than a threshold value is applied thereto, a current flows therethrough and a voltage across terminals thereof is lowered.

3. The power conversion device according to claim 1, wherein
   each of the plurality of bypass circuits further includes a non-linear element connected in parallel to the discharge gap, and
   the non-linear element has such a non-linear current and voltage characteristic that a current flows therethrough when a voltage not lower than a threshold voltage is applied thereto, and the threshold voltage is lower than a discharging start voltage of the discharge gap.

4. The power conversion device according to claim 1, wherein
   each of the plurality of diode elements is an avalanche diode, and
   each of the plurality of bypass circuits further includes a first resistive element connected in parallel to the dual-terminal element.

5. The power conversion device according claim 1, wherein
   each of the plurality of bypass circuits further includes a first resistive element connected in parallel to the dual-terminal element and a plurality of second resistive elements connected in parallel to the respective diode elements.

6. The power conversion device according to claim 1, wherein
   each of the plurality of cell blocks further includes at least one starting circuit provided in correspondence with the at least one first converter cell, and
   the starting circuit is a low-voltage circuit which is started by a charging voltage of the energy storage provided in a corresponding first converter cell, and controls any one semiconductor switching element which implements a full bridge or a hybrid bridge to turn on after the starting circuit is started.

7. The power conversion device according to claim 6, wherein
   a capacitor is adopted as the energy storage, and
   the capacitor provided in each first converter cell is higher in capacity than the capacitor provided in each second converter cell.

8. The power conversion device according to claim 6, wherein
   the energy storage includes a positive-side terminal and a negative-side terminal, and
   the starting circuit turns on two semiconductor switching elements provided on two respective arms connected to an identical terminal of the energy storage, of four arms implementing a bridge of the corresponding first converter cell when a charging voltage of the energy storage attains to a defined voltage.

9. The power conversion device according to claim 1, wherein
   the energy storage includes a positive-side terminal and a negative-side terminal,
   each of the plurality of cell blocks further includes at least one starting circuit provided in correspondence with the at least one first converter cell,
   the starting circuit is a low-voltage circuit started by a charging voltage of the energy storage provided in a corresponding first converter cell, and
   the starting circuit alternately repeats a first control state for a certain period of time and a second control state for a certain period of time after the starting circuit is started,
      in the first control state, any one semiconductor switching element implementing a full bridge or a hybrid bridge is controlled to turn on, and
      in the second control state, two semiconductor switching elements provided on two respective arms connected to an identical terminal of the energy storage, of four arms implementing the full bridge or the hybrid bridge, are controlled to turn on.

10. The power conversion device according to claim 1, wherein
    each of the plurality of bypass circuits further includes a normally open switch connected in series to the plurality of diode elements and the dual-terminal element.

11. The power conversion device according to claim 1, wherein each of the plurality of bypass circuits further includes a normally closed switch connected in parallel to the dual-terminal element.

12. The power conversion device according to claim 1, wherein each of the at least one first converter cell includes a normally closed switch connected in parallel to any one semiconductor switching element implementing a full bridge or a hybrid bridge.

13. The power conversion device according to claim 1, wherein each of the plurality of bypass circuits further includes a resistive element connected in parallel to the dual-terminal element.

\* \* \* \* \*